United States Patent [19]
Maillet

[11] 3,777,108
[45] Dec. 4, 1973

[54] MACHINING OF WORKPIECES BY ELECTRO-EROSION

[75] Inventor: Alfred Marie Aimé Maillet, Yvelines, Versailles, France

[73] Assignee: Carel Fouche Languepin, Paris, France

[22] Filed: Nov. 13, 1972

[21] Appl. No.: 306,160

Related U.S. Application Data

[63] Continuation-in-part of Ser. No. 127,217, March 23, 1971, abandoned.

[30] Foreign Priority Application Data
March 25, 1970 France .................. 7010718

[52] U.S. Cl. .............................. 219/69 P, 219/69 C
[51] Int. Cl. ............................................ B23p 1/08
[58] Field of Search .................. 219/69 C, 69 P

[56] References Cited
UNITED STATES PATENTS
3,056,065   9/1962   Porterfield .................. 219/69 P X

*Primary Examiner*—R. F. Staubly
*Attorney*—Karl F. Ross

[57] ABSTRACT

The energizing circuit of an electro-erosion system, connected across an electrode and a workpiece to be machined, comprises a source of alternating current with an operating frequency of up to 5,000 Hz from which an unbroken succession of voltage pulses is obtained by means of a full-wave raw-rectification circuit. A reactance common to both branches of that circuit, such as an inductance effectively in series therewith, maintains a residual potential difference across the erosion gap as the driving voltage of the source goes to zero, resulting in continuing ionization of a substantially stationary dielectric liquid in the gap to increase the service life of the electrode by limiting the amplitude of the current pulses.

10 Claims, 6 Drawing Figures

MACHINING OF WORKPIECES BY ELECTRO-EROSION

CROSS-REFERENCE TO COPENDING APPLICATION

This application is a continuation-in-part of my copending application Ser.No. 127,217 filed Mar. 23, 1971, now abandoned.

FIELD OF THE INVENTION

My present invention relates to a process and system for the machining of a metallic workpiece by electro-erosion with the aid of a rapid succession of high-intensity current pulses through a dielectric liquid in a gap separating an electrode from the workpiece surface to be machined.

BACKGROUND OF THE INVENTION

In the so-called EDM (electric-discharge machining) process, sparks are periodically generated by connecting the electrode and the workpiece across a source of unipolar rectangular voltage pulses which drive the electrode sharply positive and cause periodic ionization of an aqueous or nonaqueous dielectric liquid (e.g. kerosene) occupying the gap, the liquid being kept in motion to help sweep out the residual ions along with occluded gases after each discharge. Between these discharges, as the driving voltage of the source goes to zero, the gap is virtually de-ionized so as to develop a high ohmic resistance, the electrode and the workpiece then acting as a capacitance to be charged to a predetermined voltage level in order to break down the dielectric barrier for the next current pulse. The high breakdown voltages periodically built up across the gap lead to large current peaks which, aside from eroding the workpiece, also result in objectionable pitting of the electrode surface.

OBJECT OF THE INVENTION

The object of my invention, therefore, is to provide an improved electro-erosion system and process enabling the efficient machining of workpieces while minimizing irregular electrode wear.

SUMMARY OF THE INVENTION

This object is realized, in accordance with my present invention, by maintaining a continuous state of ionization in the body of liquid filling the gap, in contradistinction to conventional practice. For this purpose I apply a residual potential difference across the gap at the instants when the source voltage goes to zero, this voltage being a train of contiguous unipolar pulses with sloping flanks as obtained, for example, by raw full-wave rectification of a sinusoidal oscillation. Such a pulse train establishes an inverval of finite duration $d$ between the time when the descending flank of one voltage pulse reaches a value $V_1$, corresponding to the erosion threshold of the workpiece (as determined by the work function of its material), and the time when the ascending flank of the next pulse reaches a higher level $V_2$ corresponding to the breakdown voltage of the gap. Owing to the residual ionization of the dielectric liquid, this breakdown voltage $V_2$ is substantially below the breakdown level for the completely de-ionized gap, with corresponding reduction of the voltage spread $\Delta V = V_2 - V_1$. The gap width may lie between 0.05 and 0.7 mm, its resistance upon complete ionization being on the order of 0.1Ω.

With the residual potential difference well below the erosion threshold $V_1$, the partial ionization prevailing during the interval $d$ does not sustain a continuous arc which would prevent precision machining by electro-erosion. I have found that this is true if the cadence of the unipolar voltage pulses does not exceed substantially 10 kHz, corresponding to 5 kHz for the frequency of an original sine wave. Especially for frequencies near that upper limit, the duration $d$ of the interval of partial ionization should equal at least one-tenth of the pulse-repetition period D; thus, with $D_{min} = 10^{-5}$ sec, the minimum value of $d$ will be found to equal about 10 microseconds. The lower frequency limit is not critical; in practice, the operating frequency may be as low as 50 or 60 Hz, corresponding to the usual supply frequency of commercial a–c outlets.

The desired residual potential difference across the gap is obtained with the aid of a reactance in the energizing circuit, specifically a series inductance either upstream or downstream of the diodes of the rectification network. Such an inductance may be at least partially constituted by the winding of an alternator, serving as a sine-wave generator, or by a coupling transformer between such a generator and the rectifying diodes. The magnitude of this inductance should be sufficient to overbalance the capacitance of the erosion gap at the fundamental operating frequency, taking into account the reactance or reactances (if any) in shunt with the gap.

In many cases the maintenance of partial ionization in the intervals between current pulses is further facilitated by not subjecting the body of dielectric liquid in the gap to forced circulation (e.g. by a pump) even though the liquid may be locally displaced by relative motion between the electrode and the workpiece; see, for example, U.S. Pat. No. 3,433,919. The gases generated by the sparks may be allowed to escape through one or more venting holes in the electrode and/or in the workpiece.

With the dielectric liquid substantially immobilized, accumulation of detritus in the gap may lead to occasional virtual short circuits which normally would cause the flow of excessive current. If the presence of the aforementioned series inductance is insufficient to prevent the occurrence of objectionable current peaks, the following additional measures known per se may be taken individually or in combination:

a. insertion of a series resistance in the energizing circuit;

b. use of a coupling transformer with substantial magnetic leakage and/or with a core saturating upon the flow of a secondary current slightly above normal maximum intensity;

c. utilization of a servomechanism to increase the spacing of the electrode from the workpiece upon detecting a below-normal average gap voltage.

Although a sine-wave generator coupled with a full-wave rectifier is preferred as the voltage source, I may also use square-wave generator in combination with conventional circuitry (e.g. shunt capacitances, tuned circuits) designed to reduce the originally infinite slope of the pulse flanks. In general, the slope of these flanks should at least roughly correspond to that of a sine wave with the same open-circuit peak voltage.

BRIEF DESCRIPTION OF THE DRAWING

The above and other features of my invention will now be described in detail with reference to the accompanying drawing in which.

SPECIFIC DESCRIPTION

Figure 1:
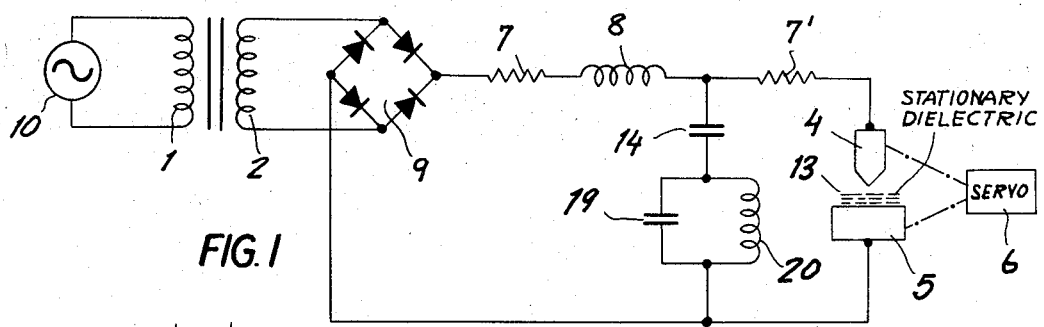
FIG. 1 is a circuit diagram of an electro-erosion system embodying the invention.

In FIG. 1 I have shown an oscillation generator 10 of frequency $f$ which may be an alternator, a sine-wave oscillator, or even a multivibrator provided with a filter stage for the suppression of harmonics. Generator 10 works into the primary 1 of a transformer whose secondary 2 is connected across a full-wave rectifier bridge 9 which converts the incoming oscillations into a train of continuous unipolar voltage pulses. The positive terminal of bridge 9 feeds an electrode 4 through a resistor 7, an inductance coil 8 and another resistor 7' all in series with one another; a workpiece 5 is tied directly to the negative bridge terminal which for convenience may be grounded. Residual harmonics, if any, are filtered out by a shunt circuit extending from the negative bridge terminal to the junction of coil 8 and resistor 7'; this bridge circuit includes a parallel-resonant network 19 and 20, tuned to the repetition frequency or cadence $2f$ of the pulses issuing from source 9, 10, and a capacitor 14 in series therewith. Impedance elements 14, 19, 20 are, of course, part of the overall reactance of the current supply and may be omitted if the series circuit is sufficiently reactive and if filtering is not required (cf. FIG. 3).

The terminal voltage of secondary 2 drops off rather rapidly upon a substantial decrease in the load impedance connected across this winding. A significant part of that impedance is the resistance of an erosion gap defined between electrode 4 and workpiece 5, this gap being occupied by an ionizable dielectric liquid 13 as is customary in the art. Contrary to the prevailing practice, however, I prefer to hold the body of liquid 13 substantially stationary as described above in order to help maintain a partial ionization of the discharge path between the electrode and the workpiece after the termination of every spark or short-term arc which bridges the gap during each pulse cycle. As the erosion of the workpiece progresses, the width of the gap may be held substantially constant by a conventional servo-mechanism 6; see, for example, U.S. Pat. No. 3,686,461. This servo-mechanism may include a source of reference voltage, e.g. in the range of 20 to 50 volts, which advances or retracts the electrode 4 with reference to the workpiece surface if the operating voltage across the gap is too high or too low. Servo 6 could also include a short-circuit detector which, upon failure of the gap voltage to rise above a predetermined threshold during a period of one or more cycles, increases the gap width to interrupt the current flow.

Figure 2:
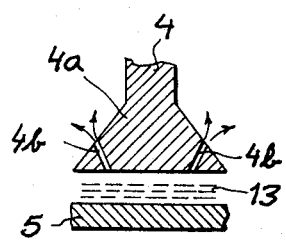
FIG. 2 is a fragmentary view of an electrode and a workpiece included in the system of FIG. 1.

As illustrated in FIG. 2, the electrode 4 may have a head 4a provided with perforations 4b forming ascending channels through which gases evolving from the liquid 13 can be vented to the atmosphere. In some instances it is also possible to fashion such venting holes in the workpiece. Detritus or chips accumulating in the erosion gap may also be flushed out through these holes by the liquid, especially upon relative oscillation of the electrode 4 and the workpiece 5 under the control of servo 6.

Figure 3:
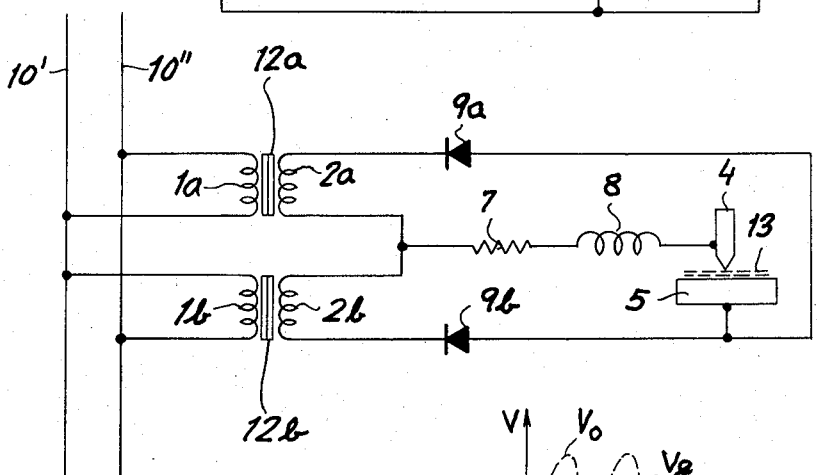
FIG. 3 is a diagram similar to FIG. 1, illustrating a modification.

In FIG. 3 I have shown an alternate energizing circuit for the maching assembly 4, 5 in which a sinusoidal voltage is developed across a pair of bus bars 10', 10" working into two transformer primaries 1a, 1b with associated secondaries 2a, 2b and cores 12a, 12b. Secondaries 2a and 2b energize respective branches of a rectification network including diodes 9a, 9b as well as a series resistor 7 and inductance 8 common to both branches. Theoretically, the circuit of FIG. 3 operates in essentially the same manner as that of FIG. 1, yet manufacturing tolerances may make the ideally identical transformers 1a, 2a, and 1b, 2b sufficiently different to vary the relative spacing of consecutive voltage pulses in an inadmissible manner.

Figure 4:
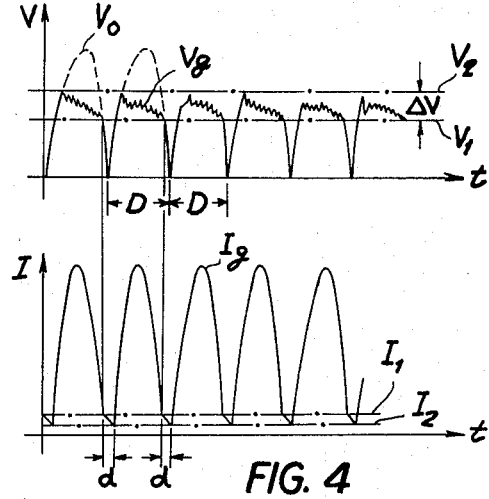
FIG. 4 is a set of graphs illustrating the voltage and current pulses generated in a system according to my invention.

FIG. 4 shows in its upper graph the gap voltage $V_g$ and in its lower graph the gap current $I_g$ plotted against time $t$; the half-sinusoidal open-circuit voltage at the source terminals has been indicated in broken lines at $V_o$. An upper level $V_2$ determines the flow of discharge current which reaches a peak $I_{max}$ and thereupon decreases to a level $I_1$ as the driving voltage of the source goes to zero. From level $I_1$ the current decays somewhat to a level $I_2$ during an interval $d$ amounting, in the example illustrated, to slightly more than 10 percent of the duration D of a voltage pulse. Level $I_2$ is still well above zero, owing to the development of a residual potential difference across the gap by the reactances of the system including particularly the series coil 8 and the inherent inductances of the transformer windings. Interval $d$ terminates as the gap voltage $V_g$ returns to the breakdown level $V_2$ to start a new cycle.

Figure 5:
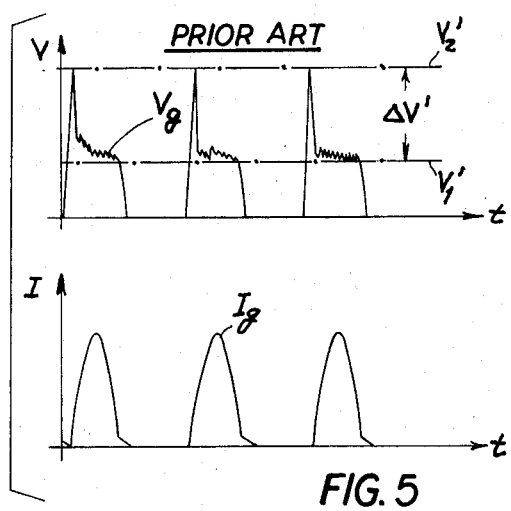
FIG. 5 is a set of graphs similar to those of FIG. 4 but relating to a conventional EDM system using half-wave rectification.

FIG. 5 shows, for purposes of comparison, the gap voltage $V_g$ and the gap current $I_g$ in a conventional system in which a capacitor periodically discharges through the gap upon being charged to the breakdown level $V_2'$ by a pulsating voltage from a half-wave rectifier, the current $I_g$ going to zero within the interval between pulses. Owing to the complete de-ionization of the gap in that interval, the breakdown level $V_2'$ and therefore the voltage difference $\Delta V' = V_2 - V_1$ is substantially higher than the corresponding level $V_2$ and voltage difference $\Delta V = V_2 - V_1$ in FIG. 4.

Figure 6:
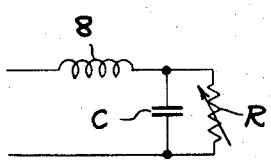
FIG. 6 shows the equivalent circuit of the erosion gap in the present system.

FIG. 6 constitutes the equivalent circuit of the gap 4, 5 which can be represented by a capacitor C in shunt with a variable resistor R, both in series with inductance 8. If the absolute amplitude of inductance 8 exceeds that of the capacitance C at the frequency of the sine wave (i.e. the operating frequency $f$ of generator 10), the current through the gap lags behind the driving voltage of the source to an extent determined by the inductance/resistance ratio of the circuit. During interval $d$, when the value of resistance R is high, this lag manifests itself in the relatively slow decay of the current from level $I_1$ to level $I_2$.

Suitable values for the series inductance 8 range between about 0.1 and 5 mH, with a circuit resistance (7 + 7') up to approximately 3Ω.

In a specific instance, in which a supply voltage of 230 v. across the primary 1 (FIG. 1) was stepped down to a secondary voltage of 175 v. (RMS), the circuit resistance 7 + 7' amounted to 1.8 Ω, the average gap voltage during discharge was 40 v., the current was 55 amps (RMS); the source frequency was 50 Hz. The peak voltage at the secondary terminals dropped from an open-circuit value of 247.5 v. to 218.3 v. during maximum current flow, this voltage regulation of 29.2 v. representing approximately 12 percent of the open-circuit voltage. Such a regulation, due to the use of a high-leakage transformer, considerably exceeds the customary value of about 4 – 5 percent. the erosion rate was 380 mm$^3$/min.

In another example, an erosion rate of 4,500 mm$^3$/min was realized with an average gap voltage of 32 v., a circuit resistance 7 + 7' of 0.02 Ω and an open-circuit voltage of 50 v. in the output of rectifier bridge 9. The working current had an intensity of 400 amps, corresponding to a gap resistance of 0.08 Ω. On discharge, the secondary voltage dropped to 44 v., this again representing a regulation of about 12 percent. During normal operation, the circuit losses I$^2$R along resistances 7 and 7' were 3.2 kW whereas the useful yield $I_oV_o$ was 12.8 kW.

With an operating frequency $f$ of 400 Hz, a working current $I_o$ with a peak amplitude $I_{max}$ of 60 amps has a maximum slope $2\pi f I_{max}$ of about 150,000 amps/sec in the vicinity of the zero line. If the associated driving voltage $V_o$ has a peak of 100 v., its flanks have a maximum slope of about 250,000 volts/sec. These values are also suitable for the maximum slope of nonsinusoidal voltages and currents of like frequency and magnitude, although somewhat lower slopes could be tolerated. Analogous relationships exist, of course, in the case of other frequencies and/or magnitudes.

As a rule of thumb, a formula $Z^2I_o \leq 50$ may be employed to determine the maximum value of the series impedance Z of the circuit consisting of the resistances 7, 7' (in ohms) and the inductance 8 (in henrys). If the circuit resistance is small, this formula yields for the inductance 8 a value of 5 mH with $f = 100$ and $I_o = 20$ amps; with the same frequency but a working current $I_o = 400$ amps, the maximum magnitude of the inductance decreases to 120 $\mu$H.

I claim:

1. A system for machining a metallic workpiece by electro-erosion, comprising:
   an electrode spaced by a gap from a surface of a workpiece to be machined;
   a body of ionizable dielectric liquid in said gap; and
   an energizing circuit including a source of contiguous unipolar voltage pulses with sloping flanks connected across said electrode and workpiece, said circuit further including reactance means for maintaining a residual potential difference across said gap at instants of zero source voltage to keep a degree of ionization in said liquid sufficient to initiate an intensified current flow through the gap on a rising flank of each voltage pulse at a level substantially below the breakdown potential of the deionized gap.

2. A system as defined in claim 1 wherein said reactance means is dimensioned to maintain said residual potential difference for a period equal to at least one-tenth of a recurrence period of said voltage pulses.

3. A system as defined in claim 2 wherein said voltage pulses have a cadence not exceeding substantially 10 kHz.

4. A system as defined in claim 1 wherein said source comprises a transformer winding and a full-wave rectification network connected to opposite terminals of a secondary winding of said transformer, said winding forming part of said resistance means.

5. A system as defined in claim 1 wherein said reactance means comprises a series inductance.

6. A system as defined in claim 1, further comprising voltage-responsive servo means connected across said gap and coupled with said electrode and said workpiece for increasing the separation thereof in the presence of a negligible potential difference across said gap.

7. A system as defined in claim 1 wherein said electrode is perforated to provide at least one ascending venting channel.

8. A method of machining a metallic workpiece by electro-erosion, comprising the steps of:
   positioning an electrode adjacent said workpiece with an intervening gap;
   disposing a body of an ionizable dielectric liquid in said gap;
   connecting said workpiece and said electrode across a source of contiguous unipolar voltage pulses with sloping flanks to generate a succession of current pulses through said gap; and
   maintaining across said gap a residual potential difference at instants of zero source voltage to keep a degree of ionization in said liquid sufficient to initiate an intensified current flow through the gap on a rising flank of each voltage pulse at a level substantially below the breakdown potential of the deionized gap.

9. A method as defined in claim 8 wherein said body of liquid is maintained substantially stationary between said pulses.

10. A method as defined in claim 8 wherein said pulses are generated at a cadence not exceeding substantially 10 kHz.

* * * * *